Nov. 26, 1957 L. E. OBERHOLTZ 2,814,300
GRAIN SEPARATING STRAW WALKER RACK
Filed Jan. 16, 1956 2 Sheets-Sheet 1

Inventor
Lester E. Oberholtz
By W. Jerold
Attorney

Nov. 26, 1957 L. E. OBERHOLTZ 2,814,300
GRAIN SEPARATING STRAW WALKER RACK
Filed Jan. 16, 1956 2 Sheets-Sheet 2
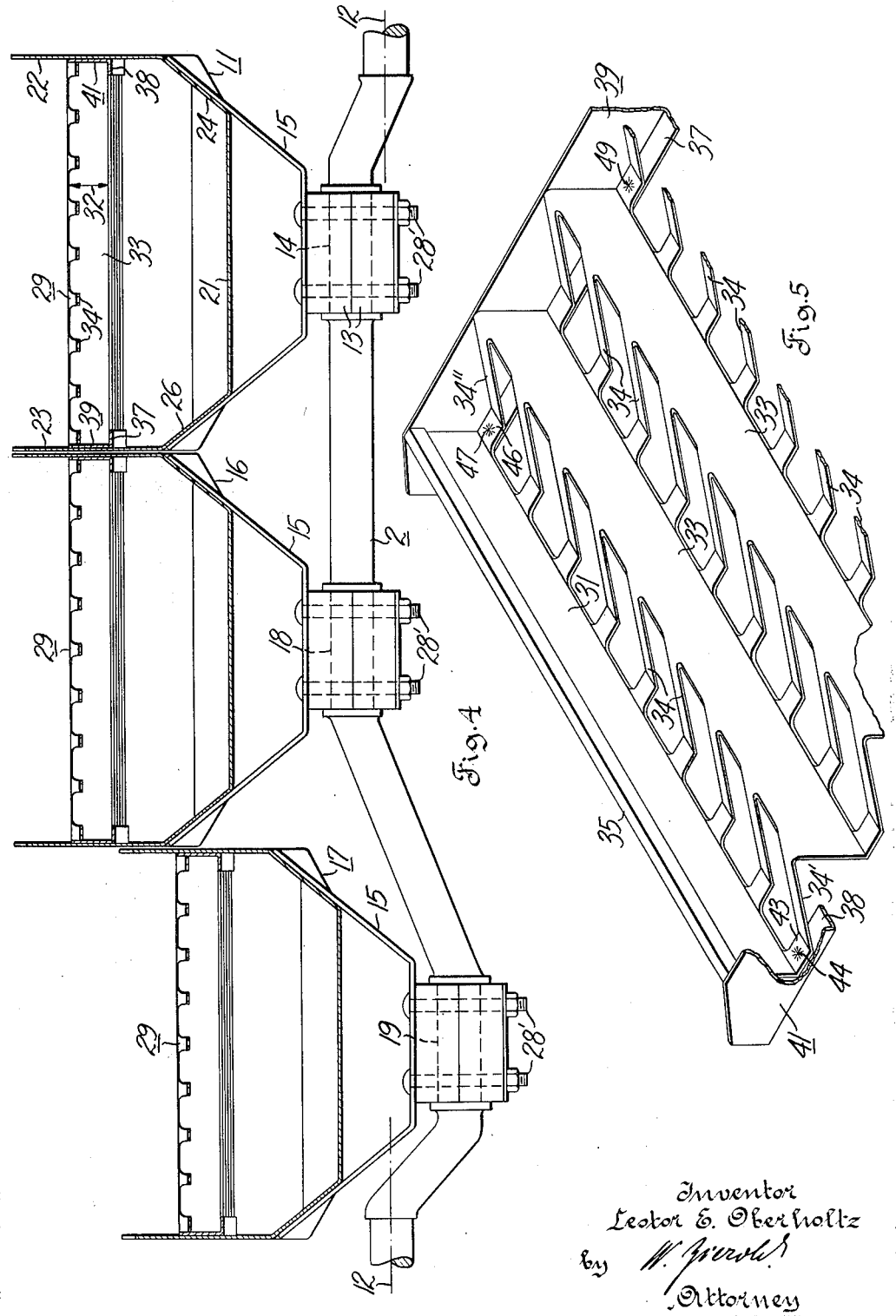

United States Patent Office 2,814,300
Patented Nov. 26, 1957

2,814,300

GRAIN SEPARATING STRAW WALKER RACK

Lester E. Oberholtz, Kansas City, Mo., assignor to Allis-Chalmers Manufacturing Company, Milwaukee, Wis.

Application January 16, 1956, Serial No. 559,452

3 Claims. (Cl. 130—26)

The invention relates to threshing machines, and it is concerned more particularly with the separator unit of such machines into which the harvested material is delivered after it has passed through the threshing zone.

In threshing machines of the straw walker type, the mentioned separator unit conventionally includes a number of individual walker sections which are arranged side by side within a housing, and a pair of multiple throw crankshafts are rotatably mounted in forward and rearward portions, respectively, of the housing for supporting and actuating the walker sections. The crankshafts are synchronously rotated in the same direction, and their rotation causes the walker sections to move up and down and back and forth in an out-of-phase relation to each other. The intended function and effect of the straw walker is to separate the mass of material which is discharged from the threshing cylinder into straw which passes over the walker sections to the rear and out of the machine, and into a gathering of grain, unthreshed heads and chaff which is subjected to further treatment within the machine. The walker sections are each provided with a rack for intercepting the straw and impelling it toward the discharge end of the housing, and each rack has perforations for the passage of grain, unthreshed heads and chaff downwardly therethrough.

Various types of racks for use in straw walkers have heretofore been suggested, but such earlier racks are believed to have not been entirely satisfactory, particularly in the matter of affording a maximum of unobstructed space for the downward passage of grain, unthreshed heads and chaff therethrough.

Generally, it is an object of the invention to provide a straw walker rack of improved construction which will afford a desirably large area for the downward passage of grain, unthreshed heads and chaffs therethrough without sacrificing other desirable features of the rack, such as simplicity of construction, low manufacturing costs, strength and good straw handling ability.

More specifically, it is an object of the invention to provide an improved straw walker section which will properly handle straw, grain, unthreshed heads and chaff, which will be of simple and sturdy construction and which lends itself to manufacture at relatively low costs.

A still further object of the invention is to provide an improved straw walker for threshing machines which is constructed and actuated in such a manner that lumpy material will be efficiently broken up by the upstrokes of the walker sections.

The foregoing and other objects and advantages are attained by the present invention various novel features of which will be apparent from the description herein and the accompanying drawings disclosing an embodiment of the invention, and will be more particularly pointed out in the appended claims.

Referring to the drawings.

Figure 2:
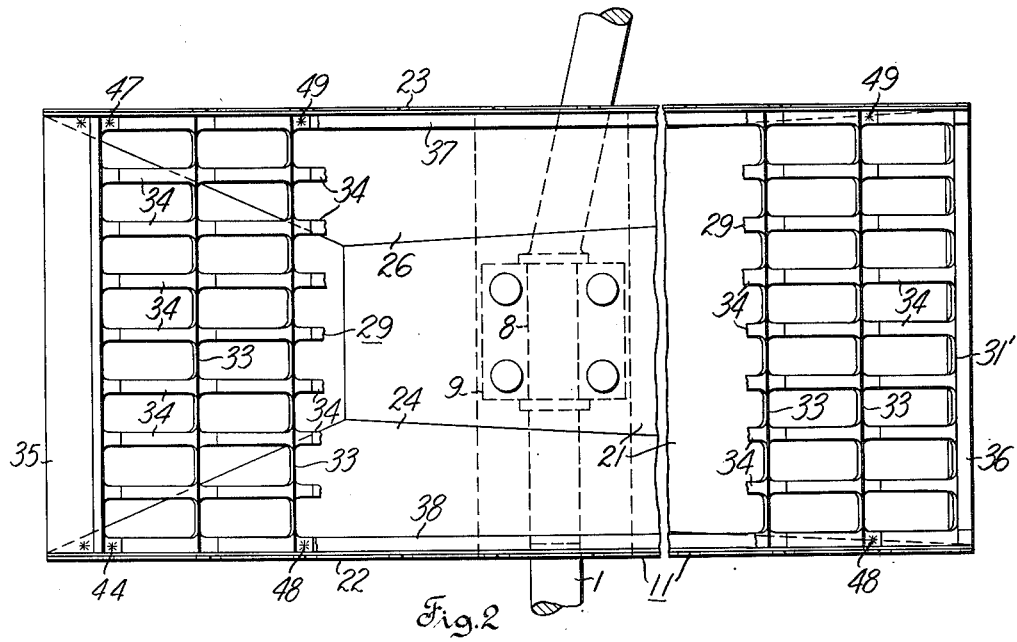
Fig. 2 is an enlarged partial top view of the straw walker section and one of the associated crankshafts shown in Fig. 1.
Figure 3:
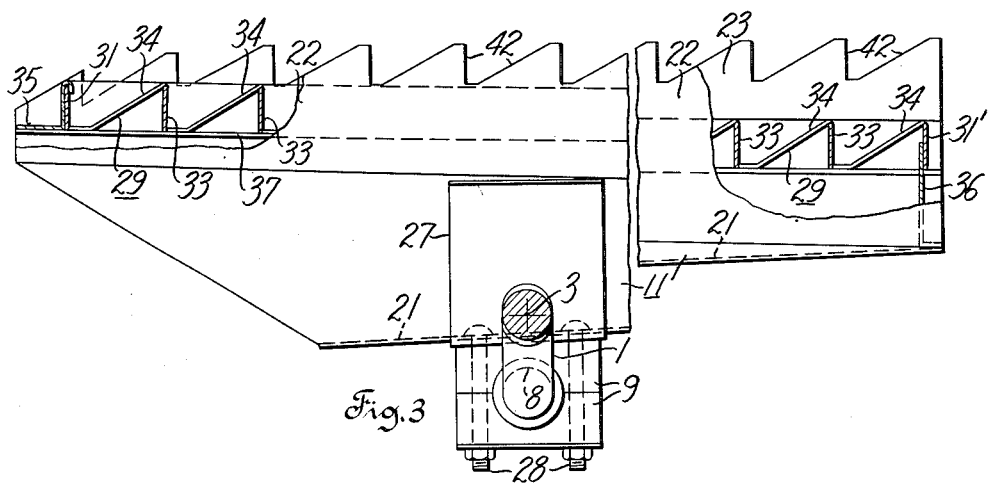
Fig. 3 is a side elevation of the parts shown in Fig. 1, portions of the walker section being broken away and shown in section.
Figure 1:
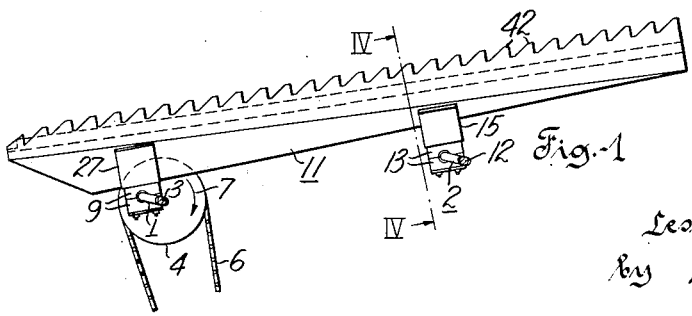
Fig. 1 is a side elevation of a straw walker section and crankshaft assembly for a threshing machine, parts of the crankshafts being broken away and shown in section.

Fig. 4 is an end elevation, partly in section, of a straw walker comprising three of the sections shown in Figs. 1 through 3, the view of Fig. 4 being drawn at the same scale as Figs. 2 and 3, and taken in a transverse plane as indicated by the line IV—IV in Fig. 1; and Fig. 5 is a perspective, fragmentary view of part of a straw walker rack incorporated in the straw walker sections shown in Figs. 1 through 4.

The reference characters 1 and 2 in Fig. 1 generally designate two multiple throw crankshafts as conventionally used in straw walkers for threshing machines, the crankshaft 1 being the one which is ordinarily mounted in the forward portion of the separator housing, not shown, and the crankshaft 2 being the rear shaft which is spaced from the front shaft in the direction of straw movement through the housing. The axis of rotation of the front shaft 1 is indicated at 3 in Figs. 1 and 3, and a drive sprocket 4 and a chain 6 serve to rotate the shaft 1 continuously on its axis 3 in the direction of arrow 7.

Fig. 3 shows the crankshaft 1 rotated in the direction of arrow 7 through about three quarters of a turn from the position in which it is shown in Fig. 1, and Fig. 2 shows a crank journal 8 of the shaft 1 which revolves in a circle about the axis 3 during rotation of the crankshaft. The crank journal 8 is embraced by a split bearing 9 at the under side of a straw walker section generally designated by the reference character 11.

The rear crankshaft 2 is rotatable on an axis 12 which extends parallel to the axis 3 of the front crankshaft 1. The walker section 11 is connected with the rear crankshaft 2 by means of a split bearing 13 which, as shown in Fig. 4, embraces a journal portion 14 of the rear crankshaft 2.

As shown in Fig. 4, the rear crankshaft 2 has an axial length sufficient to support three walker sections in side by side relation to each other, the walker section 11 being shown at the extreme right of Fig. 4 and additional walker sections 16 and 17, which are duplicates of the walker section 11, are supported on crank journals 18 and 9, respectively, of the rear crankshaft 2. In conformity with conventional practice the crank journals 14, 18 and 19 are equally spaced from each other about the axis of rotation of the crankshaft so that radial lines (not shown) from the journals 14, 18 and 19 through the axis 12 of the rear crankshaft 2 will be angularly offset 120° from each other.

The additional walker sections 16 and 17 are supported on journal portions of the front crankshaft 1 which, like the journal portions 18 and 19 of the rear crankshaft 2 are angularly displaced 120° from each other. In these respects the herein disclosed straw walker conforms with well known principles of construction and operation. That is, when the front crankshaft 1 is rotated in the direction of arrow 7 the walker section 11 will move upward and rearward from the forward position in which it is shown in Fig. 1, and at the same time the walker section 16 will move forward and downward from a rearward position and the walker section 17 will move upward and forward from the downward position in which it is shown in Fig. 14.

Referring to Figs. 2, 3 and 4, the oscillatory walker section 11 comprises a sheet metal trough which has a horizontal, longitudinally extending bottom wall 21, right and left vertical side walls 22 and 23, and converging connecting walls 24 and 26 between the side walls 22 and 23, respectively, and the bottom wall 21. The split bearing 9 (Fig. 3) which embraces the journal 8 of the front crankshaft 1, is secured to a cradle bracket 27 by means of bolts 28, the bracket 27 being rigidly secured to the outer surfaces of the converging trough walls 24 and 26, as by welding. The split bearing 13 (Fig. 4) which embraces the journal 14 of the rear crank shaft 2 is secured by means of bolts 28' to another cradle bracket 15 which, like the cradle bracket 27, is rigidly secured to the outer surfaces of the converging trough walls 24 and 26, as by welding.

A straw rack for the walker section 11 is generally indicated by the reference character 29 and extends the full length of the section from front to rear and across the full width of the section between the inner surfaces of the side walls 22 and 23. The rack 29 is constructed in the form of a perforated sheet metal stamping of zigzag profile, as best illustrated in Fig. 5. At its extreme forward end the rack has an imperforate transverse strip 31 which extends in the direction of its length across the width of the rack and in the direction of its width substantially across the effective height of the rack, such height being indicated in Fig. 4 by the double headed arrow 32. Another imperforate transverse strip 33, generally corresponding to the transverse strip 31, extends in upright position between the trough side walls 22 and 23 at a rearward spacing from the strip 31, and a transverse row of relatively spaced longitudinal strips 34 of sheet metal are connected between the pair of transverse strips 31 and 33. The longitudinal strips 34 extend in the direction of their length from the plane and top edge of the transverse strip 33 to the plane and bottom edge of the transverse strip 31, as best shown in Figs. 3, 4 and 5 so that laterally adjacent longitudinal strips 34 define material receiving openings therebetween which extend unobstructed between adjacent transverse strips 31 and 33. Additional transverse strips corresponding to the transverse strip 33 and additional transverse rows of longitudinal strips corresponding to the first row of longitudinal strips 34 and connected between pairs of adjacent transverse strips 33 succeed each other throughout the length of the rack, the last transverse row of longitudinal strips at the rear end of the rack being indicated in Fig. 2 between the last pair of transverse strips comprising a strip 33 and a rear transverse end strip 31' (Fig. 3) similar to the front transverse end strip 31. As shown at the left end of Fig. 3, the front transveres end strip 31 is connected to a transverse angle piece 35 which has a vertical flange in face to face engagement with the front face of the strip 31, and a horizontal flange of the angle piece 35 extends forwardly at right angles from the vertical flange. The upper part of the front transverse angle piece 35 is folded back over the top edge of the front transverse strip 31 to provide a reinforcement. The rear transverse end strip 31' of the rack 29 is secured to a rear transverse angle piece 36 which is secured between the side walls 22, 23 of the trough at the rear end of the latter.

The rack 29 is supported along its opposite sides within the sheet metal trough 21 through 26 on a pair of rack mounting flanges 37 and 38 which are secured, respectively, to opposite longitudinal side walls 22 and 23 of the trough and extend within the latter in a longitudinal plane at right angles to said side walls. As best shown in Fig. 5, the mounting flange 37 is formed by one leg of an angle strip 39, the other leg or side flange of which extends upwardly along the inner surface of the trough side wall 23 (Fig. 4) to which it is rigidly secured, as by spot welding. The other mounting flange 38 is similarly formed including one leg or side flange of an angle strip 41 (Fig. 4) which is secured to the inner side of the trough wall 22. The trough walls 22 and 23 are notched along their upper edges in the usual manner so as to provide fish backs 42 (Fig. 3) for assisting movement of the straw toward the discharge end of the separator housing.

It will be noted that the strip 34' (Fig. 5) at one end of the transverse row of longitudinal strips 34 is bent so as to present a lower flat portion 43 in face to face engagement with the upper surface of the adjacent mounting flange 38. The flat portion 43 is rigidly secured to the mounting flange 38 preferably by a spot weld 44. The same explanations apply to the end strip 34" at the other end of the transverse row of longitudinal strips 34, the end strip 34" having a lower flat portion 46 in face to face engagement with the upper surface of the mounting flange 37 and being rigidly secured thereto by a spot weld 47.

For manufacturing reasons the longitudinal strips 34 intermediate the end strip 34' and 34" are bent the same way as the end strips so as to present lower end portions in right angle relation to the plane of the transverse strip adjacent thereto. The upper ends of the longitudinal strips 34, 34' and 34" extend in acute angle relation to the plane of the transverse strip 33 adjacent thereto. As indicated in Fig. 2, additional spot welds 48, corresponding to the spot weld 44, are provided along the length of the rack 29 so as to secure the latter to the mounting flange 38, and additional spot welds 49, corresponding to the spot weld 47, are provided to secure the rack 29 to the mounting flange 37. The front transverse angle piece 35 and the rear transverse angle piece 36 are suitably secured at their opposite ends to adjacent side portions of the trough, preferably by spot welding.

It will be noted that the successive relatively spaced imperforate transverse strips 33 extend crosswise between the laterally spaced side flanges of the angle irons 39 and 41. The transverse strips 33 extend in the direction of their width in right angle relation to the longitudinal plane of the rack mounting flanges 37 and 38, and the effective height of the rack is substantially equal to the width of said transverse strips. As shown in Figs. 4 and 5, the transverse strips 33 are of substantially uniform width through their length, the longitudinal strips 34 being integral with the transverse strips 33 and terminating at their upper ends on substantially the same level as the upper free edge portions of the transverse strips 33 between the longitudinal strips 34.

The foregoing explanations with respect to the construction of the walker section 11 and the straw rack 29 similarly apply to the walker sections 16 and 17 which are of the same construction as the walker section 11. The straw racks 29 of the walker sections 16 and 17 are arranged in the same positions within their associated trough structures as the straw rack 29 of the walker section 11. That is, the longitudinal strips 34 of all straw racks extend in rearwardly and upwardly inclined directions and the transverse strips 33 present rearwardly facing vertical surfaces which in operation of the walker will be effective to impel the straw rearwardly toward the discharge end of the separator. Rotation of the crankshaft 1 in the direction of arrow 7 is communicated through the combined action of the three oscillatory walker sections 11, 16, 17 to the crankshaft 2 and, as a result, the walker sections will alternately impel straw delivered thereto in an upward and rearward direction. It will be noted that the perforations defined by the spaces between the transverse strips 31, 33, 31' and the longitudinal strips 34, 34', 34" are unobstructed by overhanging portions of the transverse strips and therefore afford a desirably large area for the passage of grain, unthreshed heads and chaff downwardly through the racks during operation of the walker.

Any straw that will be caught between the forwardly and downwardly slanting longitudinal strips 34 and the rearwardly facing side of the adjacent transverse strip 33 during the up stroke of the walker section will readily be liberated during the succeeding down stroke of the walker section since the rack is devoid of projections which would impede such liberation.

The top edges of the transverse strips 33 are relatively thin in the spaces between the longitudinal strips 34, and these thin edges have a knife like effect upon the material which is delivered to the walker. The herein disclosed straw rack is therefore particularly efficient in handling lumpy material since the narrow edge portions of the transverse strips will be effective during the up stroke of the walker section to break up such material.

The rack 29 may readily be formed from a single piece of sheet metal or, if desired, it may be made up from several pieces. The entire walker section, including the trough structure and the rack, lends itself to manufacture at relatively low cost and the rack, although manufactured of relatively light stock, will have sufficient strength and rigidity in spite of the relatively large open area for the unobstructed passage of grain, unthreshed heads and chaff therethrough.

It should be understood that it is not intended to limit the invention to the herein disclosed forms and details of construction and that the invention includes such other forms and modifications as are embraced by the scope of the appended claims.

It is claimed and desired to secure by Letters Patent:

1. A rack for a straw walker comprising successive, relatively spaced, imperforate transverse strips of sheet metal extending in the direction of their length across the width of said rack and in the direction of their width substantially across the effective height of said rack, and transverse rows of relatively spaced longitudinal strips of sheet metal connected between adjacent ones of said transverse strips, said longitudinal strips of each of said transverse rows extending in the direction of their length from the plane and top edge of one of the transverse strips to the plane and bottom edge of the next adjacent transverse strip, so that laterally adjacent longitudinal strips define material receiving openings therebetween which extend unobstructed between adjacent transverse strips.

2. A rack for a straw walker comprising a one piece sheet metal member of zigzag profile presenting upright, relatively spaced, imperforate transverse strips extending in the direction of their length across the width of said rack and in the direction of their width substantially across the effective height of said rack, and transverse rows of relatively spaced longitudinal strips integrally connected with and extending between adjacent ones of said transverse strips, said longitudinal strips of each of said transverse rows extending in the direction of their length from the plane and top edge of one of the transverse strips to the plane and bottom edge of the next adjacent transverse strip, so that laterally adjacent longitudinal strips define material receiving openings therebetween which extend unobstructed between adjacent transverse strips.

3. A straw walker section for threshing machines comprising; a trough structure having a bottom wall and laterally spaced side walls; and a straw walker rack including laterally spaced side flanges mounted between said side walls to extend in a longitudinal plane, a plurality of longitudinally spaced imperforate transverse strips extending in the direction of their length crosswise between said side flanges and in the direction of their width in right angle relation to said longitudinal plane, and transverse rows of laterally spaced longitudinal strips connected between adjacent transverse strips, said longitudinal strips of each of said transverse rows extending in the direction of their length from the plane and top edge of one of the adjacent transverse strips to the plane and bottom edge of the other of the adjacent transverse strips so that laterally adjacent longitudinal strips define material receiving openings therebetween which extend unobstructed between adjacent transverse strips.

References Cited in the file of this patent

UNITED STATES PATENTS

| 280,066 | Muller | June 26, 1883 |
| 757,307 | Hill | Apr. 12, 1903 |
| 1,785,195 | Hoes et al. | Dec. 16, 1930 |

FOREIGN PATENTS

| 341,646 | Italy | July 4, 1936 |